(12) United States Patent
Girard et al.

(10) Patent No.: US 9,619,120 B1
(45) Date of Patent: Apr. 11, 2017

(54) PICTURE-IN-PICTURE FOR OPERATING SYSTEMS

(71) Applicant: Google Inc., Mountain View, CA (US)

(72) Inventors: Eugene Louis Charles Girard, Kitchener (CA); Robert Flack, Kitchener (CA); Steven Chi Truong, Toronto (CA); Alexander Friedrich Kuscher, San Francisco, CA (US)

(73) Assignee: Google Inc., Mountain View, CA (US)

( * ) Notice: Subject to any disclaimer, the term of this patent is extended or adjusted under 35 U.S.C. 154(b) by 215 days.

(21) Appl. No.: 14/320,536

(22) Filed: Jun. 30, 2014

(51) Int. Cl.
*G06F 3/048* (2013.01)
*G06F 3/0484* (2013.01)
*G06F 3/0481* (2013.01)

(52) U.S. Cl.
CPC .......... *G06F 3/0484* (2013.01); *G06F 3/0481* (2013.01)

(58) Field of Classification Search
CPC ............................... G06F 3/0488; G06F 3/016
USPC ........................................................ 715/800
See application file for complete search history.

(56) References Cited

U.S. PATENT DOCUMENTS

| | | | |
|---|---|---|---|
| 5,227,771 A | 7/1993 | Kerr et al. | |
| 5,847,706 A * | 12/1998 | Kingsley | G09G 5/14 715/788 |
| 6,300,947 B1 | 10/2001 | Kanevsky | |
| 7,949,954 B1 * | 5/2011 | Jezek, Jr. | G06F 3/048 705/37 |
| 8,302,026 B2 | 10/2012 | Wang et al. | |
| 8,347,238 B2 | 1/2013 | Leffert et al. | |
| 8,356,258 B2 | 1/2013 | Matthews et al. | |
| 8,526,666 B1 * | 9/2013 | Hadden | G06F 21/10 345/592 |
| 8,560,942 B2 | 10/2013 | Fortes et al. | |
| 8,612,883 B2 | 12/2013 | Louch et al. | |
| 8,990,713 B2 * | 3/2015 | Reeves | G06F 3/1438 715/761 |
| 9,069,437 B2 * | 6/2015 | Yao | G06F 3/0481 |
| 9,218,788 B2 * | 12/2015 | Murakami | G06F 3/033 |
| 9,225,799 B1 * | 12/2015 | Dong | H04L 67/38 |
| 9,405,459 B2 * | 8/2016 | Sirpal | G06F 3/0488 |
| 9,430,449 B2 * | 8/2016 | Leblond | G06F 17/3089 |
| 2002/0089546 A1 | 7/2002 | Kanevsky et al. | |
| 2005/0114792 A1 | 5/2005 | Gest | |
| 2006/0236264 A1 | 10/2006 | Cain et al. | |
| 2006/0288305 A1 | 12/2006 | Liu | |
| 2007/0124694 A1 | 5/2007 | Van de Sluis et al. | |
| 2007/0143668 A1 * | 6/2007 | Fortes | G06F 17/211 715/209 |

(Continued)

*Primary Examiner* — David Phantana Angkool
(74) *Attorney, Agent, or Firm* — McDermott Will & Emery LLP

(57) ABSTRACT

Aspects of the subject technology relate to scaling an application window. A method includes determining a first window size for an application, and instructing the application to render at the first window size. The method also includes determining a second window size for the application, scaling the first window size to the second window size based on a scale value, and displaying the scaled application at the second window size. The scaling allows a full-screen view of the application to be displayed on a smaller window, or allows shrinking the application window to a size below a normal minimum window size. Inputs to the scaled window are also scaled so that the application continues to behave as if rendered at the first window size.

20 Claims, 8 Drawing Sheets

(56) References Cited

U.S. PATENT DOCUMENTS

| | | |
|---|---|---|
| 2009/0051706 A1 | 2/2009 | Fleming |
| 2009/0144653 A1 | 6/2009 | Ubillos |
| 2010/0281400 A1 | 11/2010 | Forutanpour et al. |
| 2012/0030616 A1 | 2/2012 | Howes et al. |
| 2012/0086717 A1* | 4/2012 | Liu .................. G06F 9/4445 345/564 |
| 2012/0297336 A1 | 11/2012 | Lin et al. |
| 2013/0167076 A1 | 6/2013 | Brunner et al. |
| 2013/0235071 A1* | 9/2013 | Ubillos ............ G06F 3/0484 345/600 |
| 2013/0268875 A1 | 10/2013 | Han et al. |
| 2014/0053097 A1 | 2/2014 | Shin et al. |
| 2014/0125554 A1* | 5/2014 | Pan .................... G06T 3/40 345/2.2 |
| 2014/0208250 A1 | 7/2014 | Ording et al. |

* cited by examiner

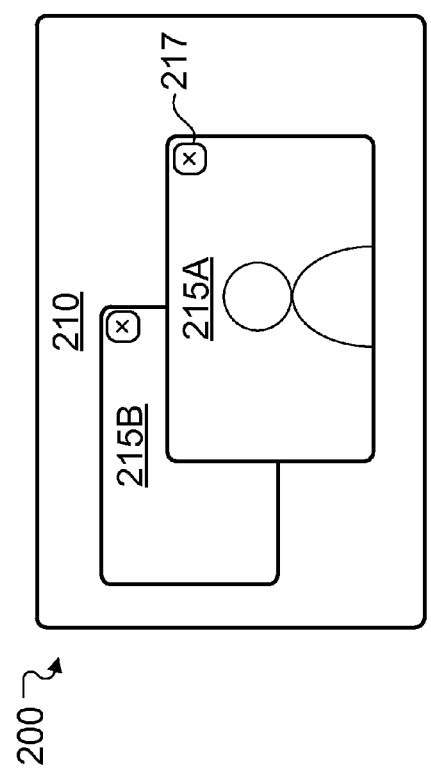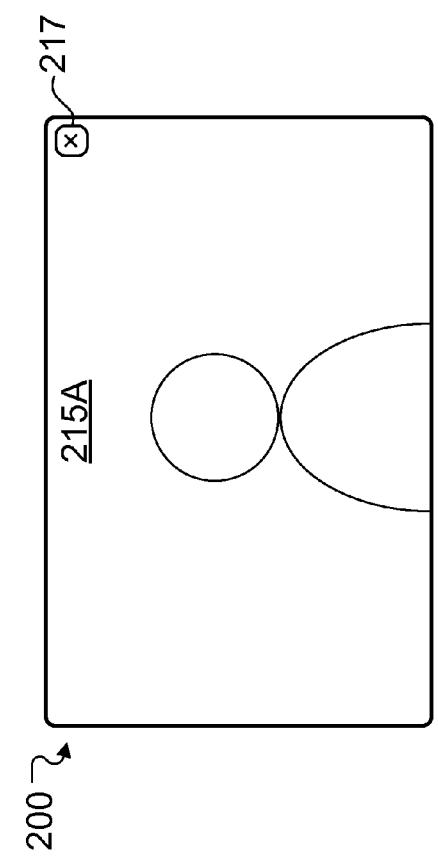

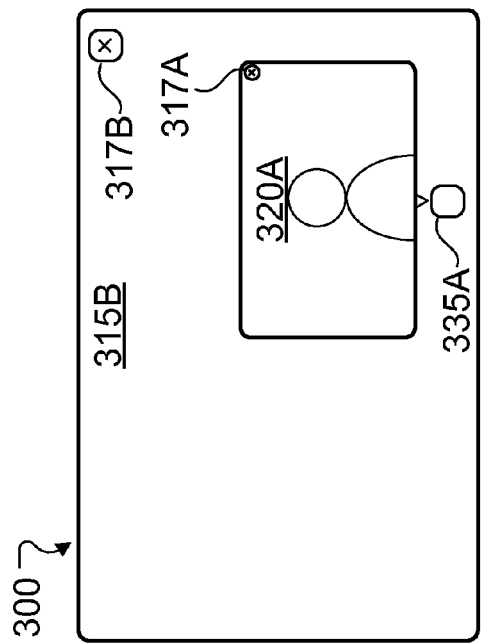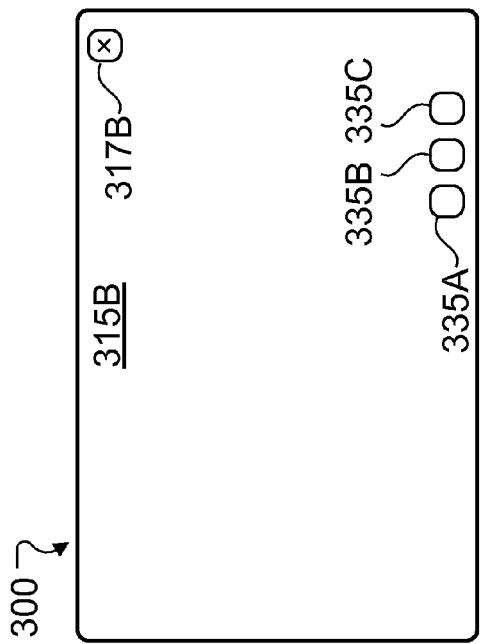

PICTURE-IN-PICTURE FOR OPERATING SYSTEMS

BACKGROUND

The present disclosure relates generally to displaying multiple applications and more particularly to methods and systems for resizing application windows beyond the application's configured window size limits.

An operating system (OS) having a graphical user interface (GUI) allows a user to multi-task by displaying multiple running programs or applications on one or more displays. The OS may display each application in its own application window on the display. The OS may signal to each application a window size, such that the application knows to render itself for that window size.

SUMMARY

Aspects of the subject technology relate to a method for resizing an application window beyond the application's configured window size limits. The method includes determining a first window size for displaying a first application on a display and performing a first rendering of the first application at the first window size. The method further includes determining a second window size for displaying the first application on the display and determining a scale value for scaling the first rendering to the second window size. The method further includes performing a second rendering of the first application at the second window size, based on scaling the first rendering to the second window size according to the determined scale value and displaying the second rendering on the display. The method further includes receiving a user input in association with the second rendering, adjusting the user input based on the determined scale value, and providing the adjusted user input to the first application.

Aspects of the subject technology also relate to a non-transitory machine-readable medium including instructions stored therein, which when executed by a machine, cause the machine to perform operations. The operations include determining a first window size for displaying a first application on a display and performing a first rendering of the first application at the first window size. The operations further include determining a second window size for displaying the first application on the display and determining a scale value for scaling the first rendering to the second window size. The operations further include performing a second rendering of the first application at the second window size, based on scaling the first rendering to the second window size according to the determined scale value and displaying the second rendering on the display. The operations further include receiving a user input in association with the second rendering, adjusting the user input based on the determined scale value, and providing the adjusted user input to the first application.

Aspects of the subject technology also relate to a system. The system includes one or more processors and a non-transitory computer-readable medium comprising instructions stored therein, which, when executed by the one or more processors, cause the one or more processors to perform operations. The operations include determining a first window size for displaying a first application on a display and performing a first rendering of the first application at the first window size. The operations further include determining a second window size for displaying the first application on the display and determining a scale value for scaling the first rendering to the second window size. The operations further include performing a second rendering of the first application at the second window size, based on scaling the first rendering to the second window size according to the determined scale value and displaying the second rendering on the display. The operations further include receiving a user input in association with the second rendering, adjusting the user input based on the determined scale value, and providing the adjusted user input to the first application.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

FIG. 2A depicts an operating system (OS) screen with multiple application windows according to example aspects of the present disclosure;

FIG. 2B depicts an OS screen with a full screen application window according to example aspects of the present disclosure;

FIG. 3E illustrates the scaled window with an icon according to example aspects of the present disclosure;

FIG. 3F illustrates multiple icons for scaled windows according to example aspects of the present disclosure;

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

An OS provides applications running on the OS a window size for rendering. However, the application may not be configured to render at certain window sizes such as user-selected window size. In addition, with multiple windows of various sizes being displayed on a display with a limited screen size, a window may be at least partially hidden by another window. For instance, a full-screen or otherwise large window may require a significant portion of the screen display, requiring another window to be hidden behind the large window, or to partially cover the view of the large window. Certain OS's may provide preview options of limited interactivity for the hidden windows.

The subject technology provides systems and methods of displaying multiple applications. The OS may instruct the application to render at a first window size, scale the rendered application, and display the application at a second window size. Inputs to that window may be similarly scaled such that the application behaves as if it were actually rendered in the first window size. For example, the OS may instruct the application to render at a full-screen size, which may be a maximum window size for the display. The OS may then scale down the full-screen application to another size, such as ⅛ of the display's screen. The OS may then display the scaled down window on, for example, a corner of the display, above other windows or OS elements. In another example, the user may desire the application to be displayed in a window smaller than a minimum window size for the application. The OS may instruct the application to render at its minimum window size, which the OS may then scale to another size, such as 5% smaller than the application's minimum window size to achieve the user's desired window size.

Figure 1:
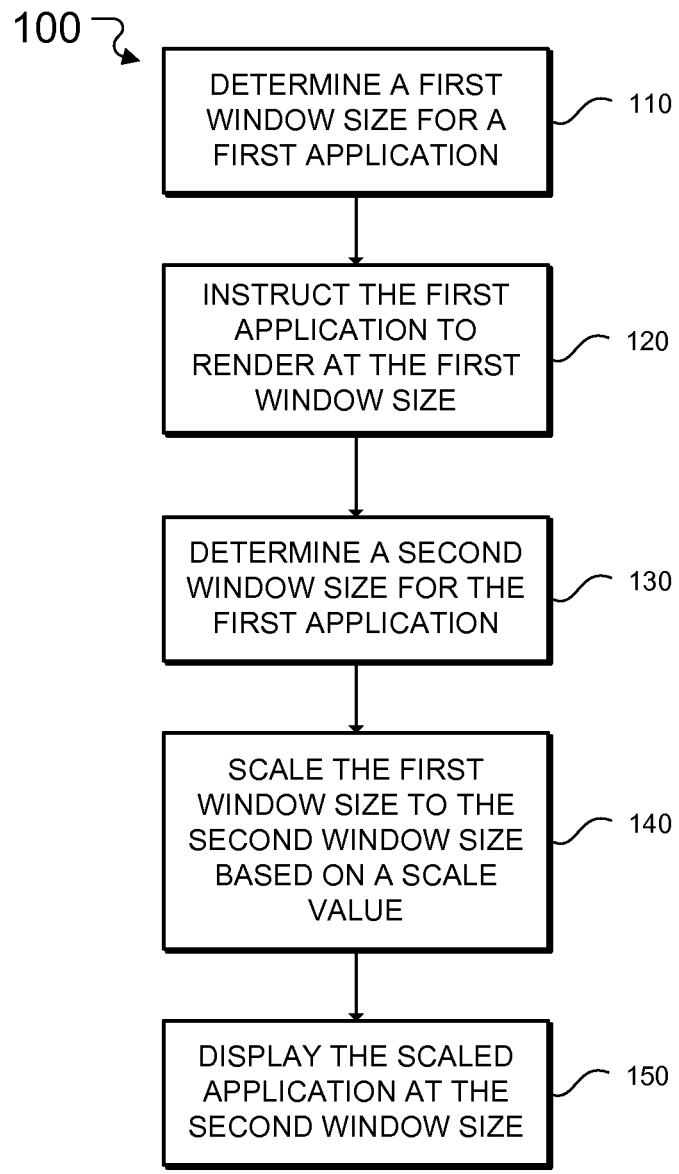
FIG. 1 illustrates a flowchart of scaling an application window according to example aspects of the present disclosure.

FIG. 1 depicts a flow chart 100 of a process of displaying multiple applications according to example aspects of the subject technology. At block 110, a first window size for a first application is determined. The first window size may be determined by a user selection or be based on device settings or otherwise automatically selected. For example, in a picture-in-picture (PIP) mode, the first window size may be based on the maximum screen size for the display. In a window scaling mode, the first window size may be based on a minimum window size the application is configured to display on. At block 120, the first application is instructed by the OS to render itself at the first window size.

At block 130, a second window size for the first application is determined. The second window size may be user selected or otherwise automatically selected. For example, in the PIP mode, the second window size may be automatically determined by the OS, through for instance previously selected user settings, or may be selected by the user. In the window scaling mode, the second window size may be selected by the user, such as through a window resizing interface, or may be a predetermined minimum window size for the OS. The second window size differs from the first window size and may be larger or smaller than the first window size.

At block 140, the first window size is scaled to the second window size based on a scale value. At block 150, the scaled application is displayed at the second window size. For instance, the OS may use a memory or other buffer for storing the application rendered at the first window size. The first window size rendering may be scaled by the scale value to generate a second window size rendering. The second window size rendering may then be displayed on the display. The OS does not inform the first application about the scaling such that the first application behaves as if it were rendered at the first window size.

The inventive concepts herein may be performed by a computing device having a processor, memory, and a display. For example, the computing device may be a tablet computer, a desktop computer, a laptop computer, a smart display, or a smartphone. The computing device may be configured to run an OS capable of displaying one or more application windows on the computing device's display. The multiple applications may run local to the computing device, or in conjunction with communications with a remote device, such as a server.

FIGS. 2A-2B depict an OS screen 200 according to one implementation. In FIG. 2A, the screen 200 includes a main portion 210, a first application window 215A, and a second application window 215B. The main portion 210 may display a background of the OS including any OS elements, or may be one or more applications running on the OS. The first application window 215A and the second application window 215B may be two different applications running on the OS. In FIG. 2A, the first application window 215A overlaps the second application window 215B, although other layouts and presentations are possible. Each application window also includes a user interface (UI) element 217, which may be a close application button in FIGS. 2A-2B. In other implementations, the UI element 217 may comprise other OS commands and icons, such as a minimize or maximize button, and each application window may include more or less UI elements 217.

In FIG. 2B, the first application window 215A is maximized or at a full screen size. The first application is instructed by the OS to render at a maximum size, which may be the screen size of the screen 200, or a maximum size at which the first application is configured to render. As seen in FIGS. 2A and 2B, UI elements such as the UI element 217 are rendered at a consistent size for the OS.

Maximizing the first application window 215A, or making the first application window 215A full screen obscures the second application window 215B, as well as the main portion 210. The user may wish to be able to see other applications, such as the second application window 215B, while monitoring the first application window 215A for updates. For example, the first application window 215A may show a loading screen while the first application loads.

FIGS. 3A-3E depict an OS screen 300 according to one or more implementations. The screen 300 includes a main portion 310, a first scaled screen 320A, and a second application window 315B. The main portion 310 may display a background of the OS, or may be one or more applications running on the OS. The first scaled screen 320A may be a target application rendered at a first window size, such as a maximum size for the target application or a size of the main portion 310, which is then scaled to a second window size, such as the size of the first scaled screen 320A. The first scaled screen 320A includes a scaled UI element 317A, and the second application window 315B includes a UI element 317B. The UI elements 317A and 317B may each be one or more UI elements, such as buttons for minimizing, maximizing, or closing a window.

The first scaled screen 320A may correspond to the first application window 215A as seen in FIG. 2B, and the second application window 315B may correspond to the second application window 215B in FIG. 2A. Unlike in FIG. 2B, in which maximizing the first application window 215A obscures other portions of the screen 200, a UI element similar to the UI element 317B may allow the user to scale the target application. The screen 300 is able to show the target application at full screen by rescaling it to a smaller window size as described herein. The first scaled screen 320A may be displayed over a portion of the second application window 315B, similar to picture-in-picture (PIP) on certain televisions. However, the first scaled screen 320A may also be interacted with. The second application window 315B may be normally interacted with, such as maximizing it as seen in FIG. 3B, while having the first scaled screen 320A displayed over the maximized second application window 315B.

The UI element 317B remains normal-sized (e.g., at a consistent size for the OS). However, the UI element 317A may be scaled down along with the full-screen or target application. Because the target application is scaled, all the included elements may also be scaled. In certain implementations, the OS may further detect the scaling of UI elements and restore their sizes or undo their scaling. The first scaled screen 320A allows normal user interaction, which may further require scaling of user inputs.

An input 350A may correspond to a user input through, for example, a touchscreen or other input device. Because the input 350A is within the first scaled screen 320A, the OS would normally provide the input 350A to the target application. However, because the target application is rendered at the first window size, and the user sees and interacts with the second window size, the input 350A may not correspond to the user's intended input. For example, if the OS sends the input 350A unscaled to the target application, the target application may interpret the input 350A as the input 350B. For instance, the x and y coordinates of the input 350A would register as being in the relative x and y coordinates within the first scaled screen 320A, as seen by the input 350B.

The OS may scale the input 350A, for example, using the same scale as the first window size to the second window size. The OS may additionally modify the input 350A as needed, such as translating or shifting the scaled coordinates relative to the location of the first scaled screen 320A, in order to ensure the target application receives an input as the user intended. In addition, the OS may only scale user input over the first scaled screen 320A, such that the user may interact with the rest of the screen 300 without scaling user inputs. Thus, the OS allows the user to see a full version of the target application as it updates, and interact with the target application within the first scaled screen 320A, while further allowing the target application to behave as if rendered at the first window size. Although the first scaled screen 320A is shown in the lower right corner of the screen 300, in other implementations the location of the first scaled screen 320A can be elsewhere, such as the other corners, or may be movable by the user.

Figure 3A:
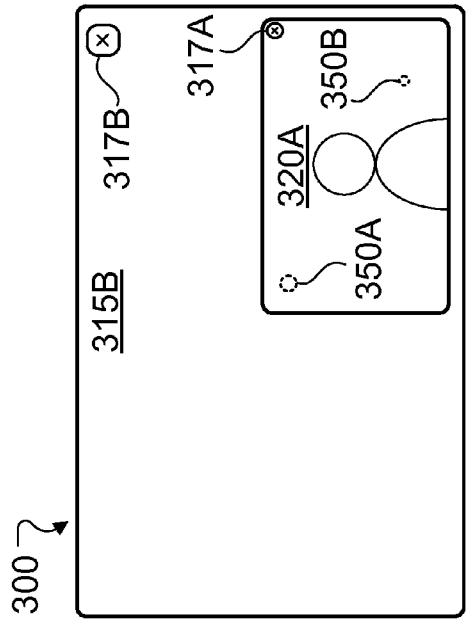
FIG. 3A illustrates an OS screen with an application window and a scaled window according to example aspects of the present disclosure.
Figure 3B:
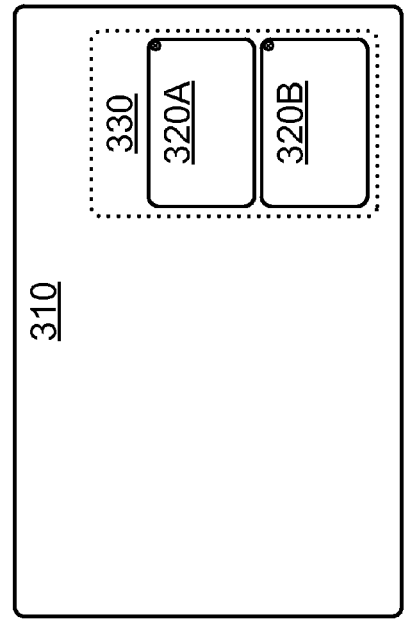
FIG. 3B illustrates the OS screen with a full screen application and a scaled window according to example aspects of the present disclosure.
Figure 3C:
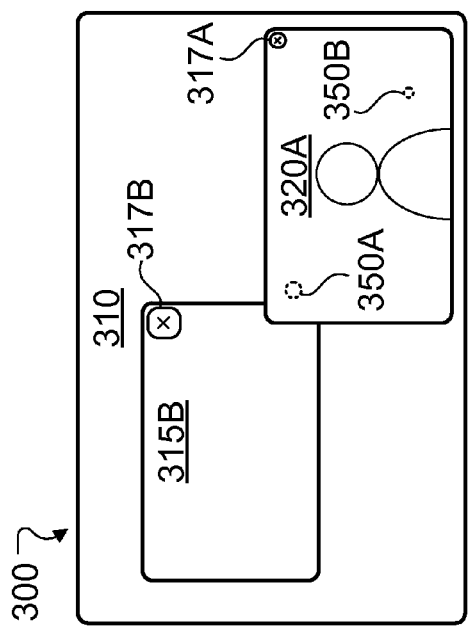
FIG. 3C illustrates resizing the scaled window according to example aspects of the present disclosure.

FIG. 3C shows the screen 300 with the first scaled screen 320A being resized. A UI element 360, which may correspond to a window resizing UI element, may allow the user to resize the first scaled screen 320A to a third window size. The user may, for example, drag the corners or edges of the first scaled screen 320A to resize it. However, the target application itself continues to render at the original first window size. The resizing may instead change the scale value such that the target application is not aware of the resizing.

Figure 3D:
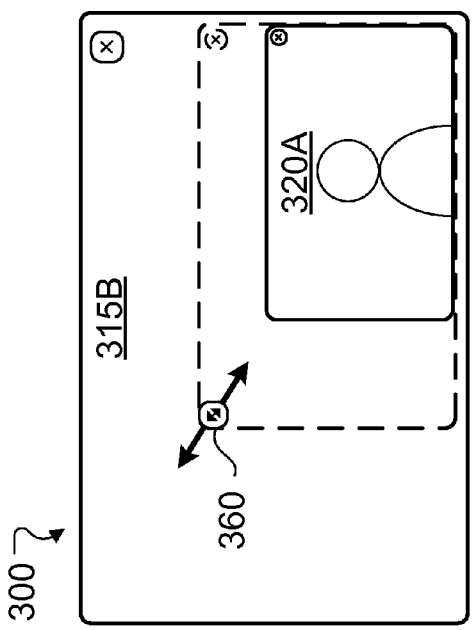
FIG. 3D illustrates multiple scaled windows according to example aspects of the present disclosure.

FIG. 3D illustrates the screen 300 according to another implementation. The screen 300 may also include a panel 330. The panel 330 may be a notification portion or area displayed by the OS, which may, for example, show minimized versions of applications, icons, and other graphical or textual notifications corresponding to updates to the status of application. The panel 330 may be resizable, or automatically resize based on the notifications. The first scaled screen 320A may be a first target application rendered at a first window size, which is then scaled by a first scale value to a second window size, such as the size of the first scaled screen 320A. The second scaled screen 320B may be a second target application rendered at a third window size, which is then scaled by a second scale value to a fourth window size, such as the size of the second scaled screen 320B. The first and third window sizes may both be maximum window sizes for the respective first and second target applications or may be any other size. The second and fourth window sizes may be the same window size, or may be any other window size as needed or selected. Similarly, the first and second scale values may be the same or differ based on the final window sizes. Inputs to the second scaled screen 320B may also be appropriately scaled or adjusted as described herein.

Rather than having the first or second scaled portions 320A and 320B in specified locations in the screen 300, such as a corner as seen for example in FIGS. 3A-3C, the scaled screens 320A and 320B may be displayed vertically adjacent within the panel 330. In addition, the scaled screens 320A and 320B may further be placed horizontally adjacent, or any other layout. The panel 330 may be hidden until the first target application or the second target application registers an update or status change. In response to the status change, the panel 330 may pop up with the first scaled screen 320A and/or the second scaled screen 320B displayed.

In other implementations, the panel 330 may be optional, such that the first scaled screen 320A and the second scaled screen 320B are moved and placed around the screen 300 similar to other application windows. The user may be able to reposition the scaled screens 320A and 320B such as through a drag operation, or other layout operation including tiling or collating.

FIGS. 3E-3F depict another implementation. The target application shown in the first scaled screen 320A may be associated with an icon 335A, which may be a notification icon overlaid other elements on the screen 300. When the target application registers an update or other status change, the icon 335A may expand or show a notification or panel window, which may include the first scaled screen 320A. As seen in FIG. 3F, icons 335A-335C may correspond to several different applications, and allow for several scaled screens to be managed by the user. In FIG. 3F, the user may see the second application window 315B at full screen, while keeping applications represented by the icons 335A-335C running at full-screen without obstructing the screen 300.

Figure 4:
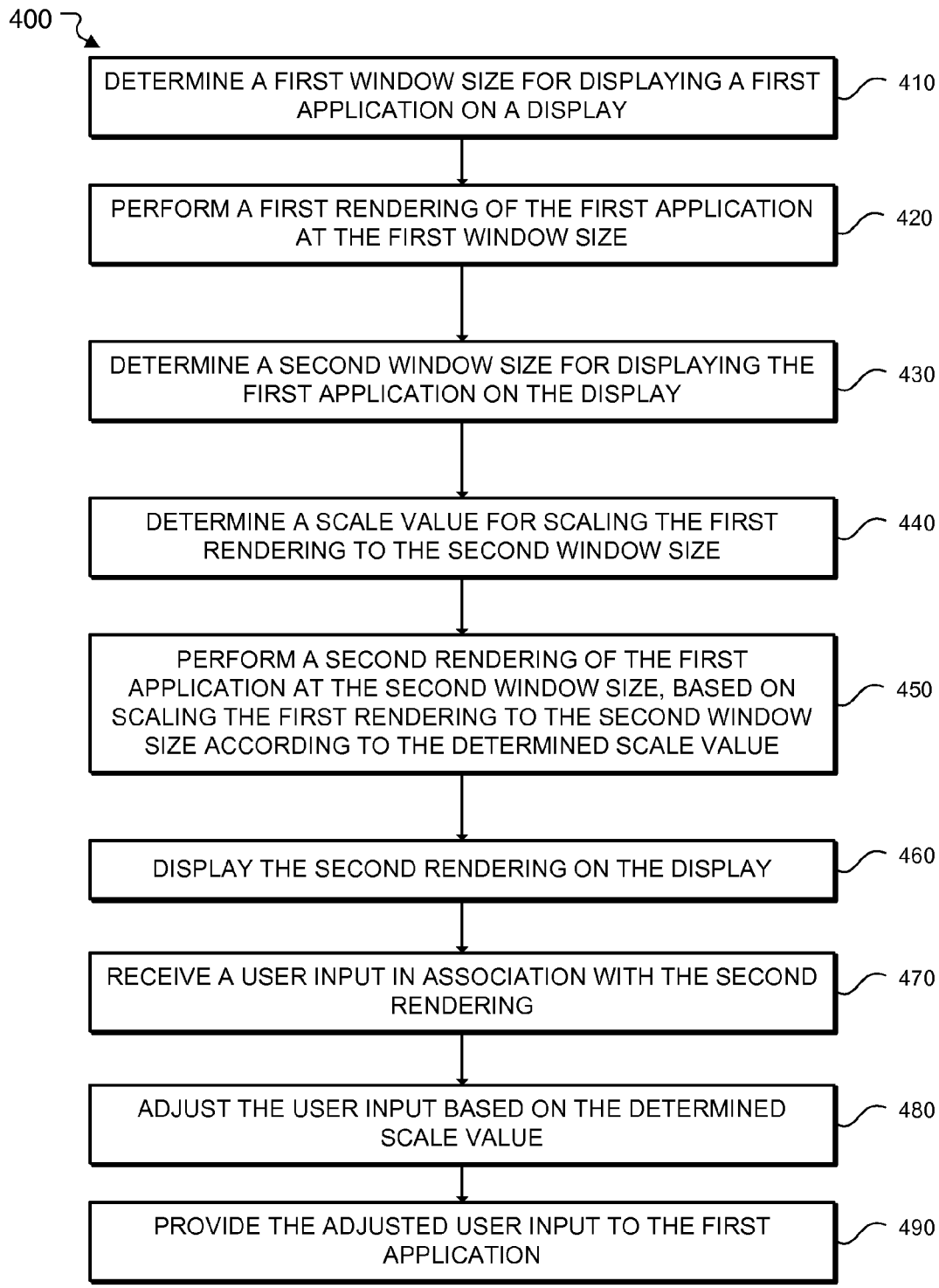
FIG. 4 is a flowchart illustrating a process for scaling an interactive application window according to example aspects of the present disclosure.

FIG. 4 shows a flowchart 400 of a process for scaling a window, such as a PIP mode. At block 410, a first window size is determined for displaying a first application on a display. Although the first window size may correspond to a maximum window size, in other implementations, any other window size may be used, such as a minimum window size for the OS or the first application, an optimal window size for the first application, or any other window size as needed. At block 420, a first rendering of the first application is performed at the first window size. At block 430, a second window size is determined for displaying the first application on the display. The second window size may be a default window size for the OS, and may further be modified by user input, such as a window resizing operation.

At block 440, a scale value is determined for scaling the first rendering to the second window size. The scale value may be a linear value, such as a multiplier, but in other implementations may be other values, such as a matrix. At block 450, a second rendering of the first application is performed at the second window size, and is further based on scaling the first rendering to the second window size according to the determined scale value. The scaling may be similar as described above with the flowchart 100. At block 460, the second rendering is displayed on the display. The first rendering may not be displayed on the display, or may be initially displayed before the OS performs the scaling, which may be in response to a user input or automatic OS task. However, once the scaling or PIP mode is activated, the first rendering is not displayed at the first window size on the display.

At block 470, a user input is received in association with the second rendering. For example, as seen in FIGS. 3A and 3B, the user input may be within the portion of the display which displays the second rendering. At block 480, the user input is adjusted based on the determined scale value. For example, a location component of the user input, such as x and y coordinates, may be scaled by the determined scale value. Other values may be scaled, and other adjustments, such as shifting of values, may further be performed. At block 490, the adjusted user input is provided to the first application. The user input is adjusted such that the user interacts normally with the second rendering, while the application responds as if operating as the first rendering.

Figure 5:
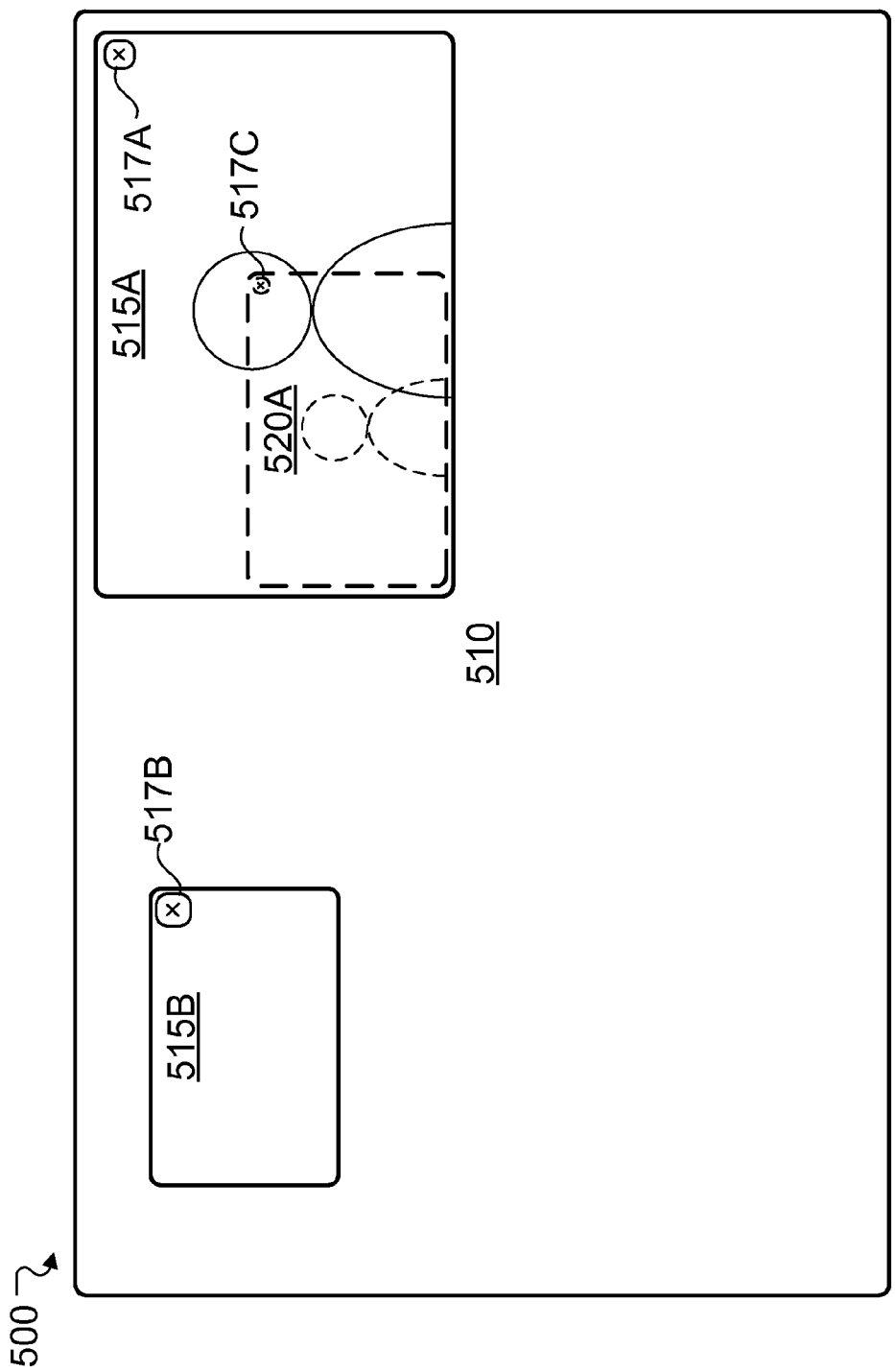
FIG. 5 depicts scaling a resized application window according to example aspects of the present disclosure.

FIG. 5 illustrates an OS screen 500 according to another implementation. The screen 500 includes a main portion 510, a first application window 515A, and a second application window 515B. The main portion 510 may display a background of the OS including any OS elements, or may be one or more applications running on the OS. The first application window 515A and the second application window 515B may be two different applications running on the OS. The first application window 515A includes a UI element 517A, and the second application window 515B includes a UI element 517B. The UI elements 517A and 517B may each be one or more UI elements, such as buttons for minimizing, maximizing, or closing a window.

The user may wish to resize the first application window 515A corresponding to a target application. However, the user may wish to resize the first application window 515A beyond a threshold window size for the target application. The target application may be configured to have a minimum or maximum window size, beyond which the target application will not render accordingly. For instance, if the threshold window size is a minimum window size defined by the target application, the target application may not allow for a smaller window size and render at the minimum window size. Alternatively, if the threshold window size is a maximum defined by the target application, further expanding the window size may result in the additional space being rendered empty by the OS. The OS may also set a threshold window size. For example, at window sizes below a minimum window size for the OS, the UI elements of the OS may interfere, or the window size may be too small to provide a usable interface to the user based on the UI elements. In other implementations, the threshold window size may correspond to window sizes at which the application may change behavior. For example, the threshold window size may correspond to a window size at which the application switches from a desktop version to a mobile version, which may also change UI elements.

In FIG. 5, the first application window 515A may be at a threshold window size. The user may perform or be performing a resize operation, and may wish to further resize the first application window 515A beyond the threshold window size, for example by further reducing it. At the threshold window size, the OS may continue to instruct the target application to render at the threshold window size while allowing the user to select a new window size. The OS may determine a scale value for scaling the threshold window size to the selected window size, and perform a second rendering based on the determined scale value. The second rendering may be displayed on the screen 510. The user may perform the resize operation seamlessly, without stopping at the threshold window size. In FIG. 5, the screen 500 is in the middle of a resize operation, showing the first scaled window 520A as an outline or preview. A UI element 517C, which may correspond to the UI element 517A, is shown as being scaled. As described herein, any user inputs to the first scaled window 520A may be scaled or otherwise adjusted such that the target application behaves as if rendered at the threshold window size, and maintaining the user's intended input.

Figure 6:
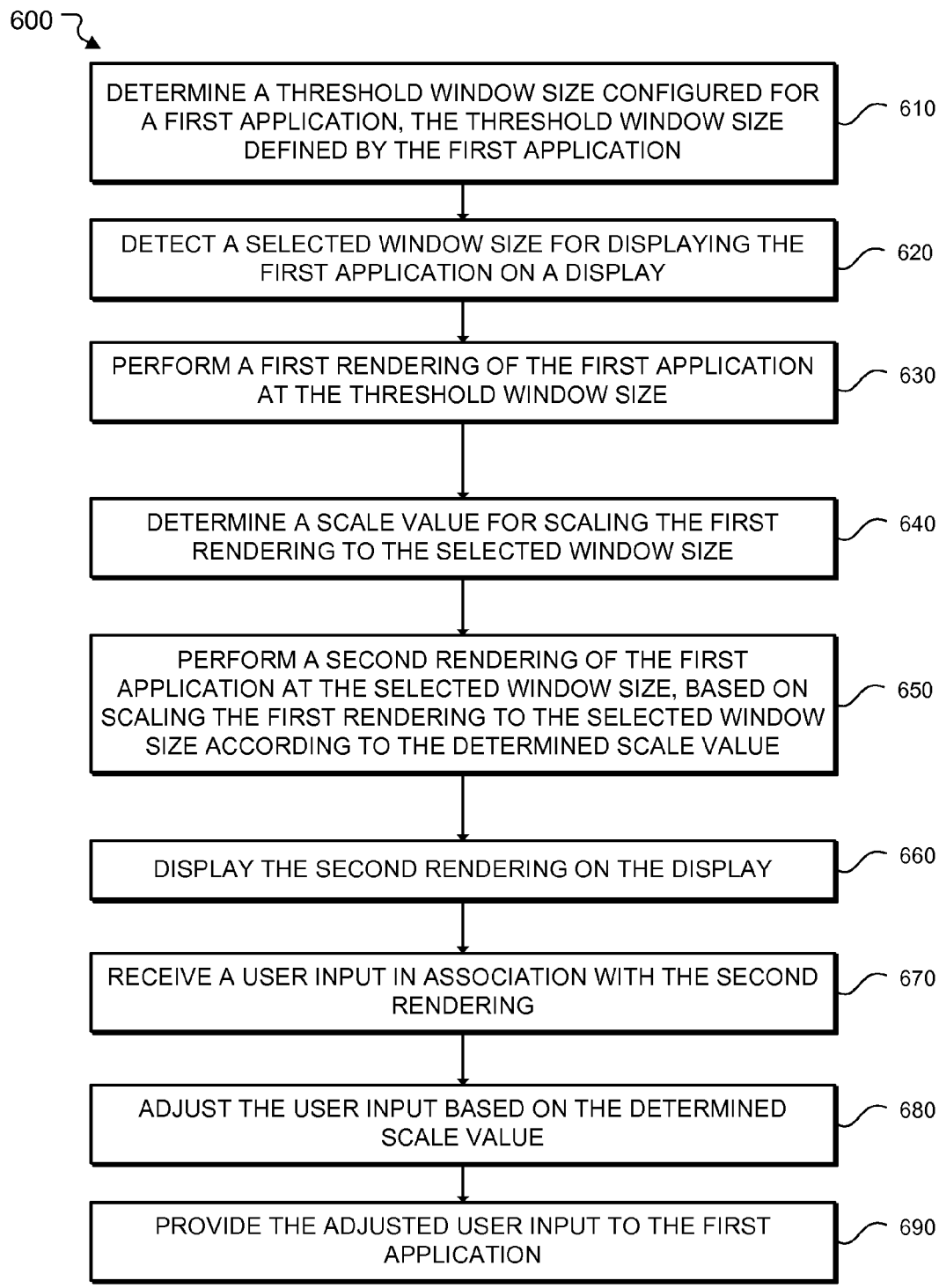
FIG. 6 is a flowchart illustrating a process for resizing a window through scaling according to example aspects of the present disclosure.

FIG. 6 depicts a flowchart 600 of a process for scaling windows beyond threshold window sizes according to an implementation. At block 610, a threshold window size configured for a first application is determined, wherein the threshold window size is defined by the first application. At block 620, a selected window size for displaying the first application on a display is detected. For example, the user may use a UI element such as the UI element 360 in FIG. 3C to select the selected window size. At block 630, a first rendering is performed of the first application at the threshold window size.

At block 640, a scale value is determined for scaling the first rendering to the selected window size. At block 650, a second rendering of the first application is performed at the selected window size and based on scaling the first rendering to the selected window size according to the determined scale value. The scaling may be similar as described above with the flowchart 100. At block 660, the second rendering is displayed on the display. The first rendering may not be displayed at the threshold window size on the display once the scaling feature is activated. The scaling feature may automatically be activated as the resize operation reaches and crosses the threshold window size.

At block 670, a user input is received in association with the second rendering. At block 680, the user input is adjusted based on the determined scale value. For example, a location component of the user input, such as x and y coordinates, may be scaled by the determined scale value. Other values may be scaled, and other adjustments, such as shifting of values, may further be performed. At block 690, the adjusted user input is provided to the first application. The user input is adjusted such that the user interacts normally with the second rendering, while the application responds as if operating as the first rendering.

Figure 7:
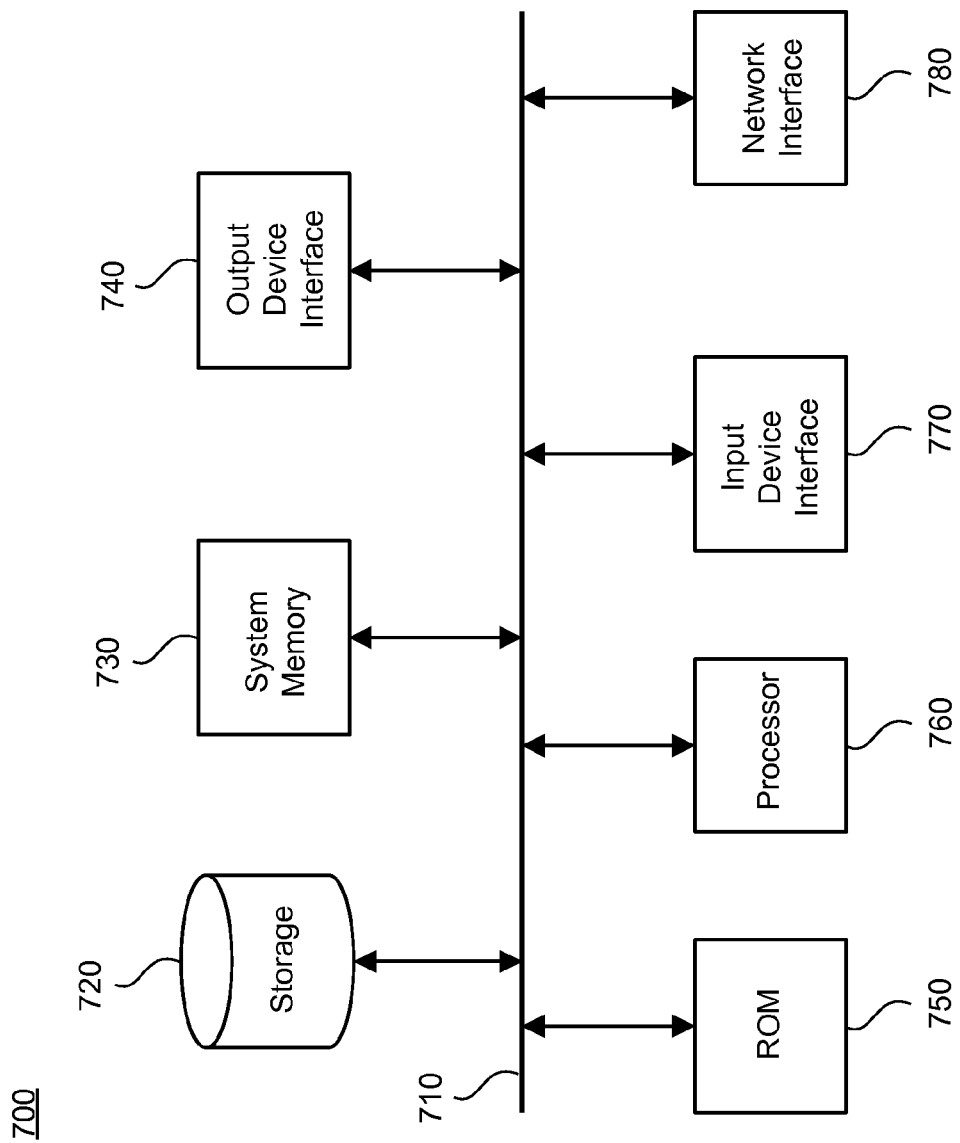
FIG. 7 conceptually illustrates an example electronic system with which some implementations of the subject technology can be implemented according to example aspects of the present disclosure.

FIG. 7 conceptually illustrates an example electronic system with which some implementations of the subject technology can be implemented. Electronic system 700 can be a computer, phone, PDA, or any other sort of electronic device capable of displaying multiple applications. Such an electronic system includes various types of computer readable media and interfaces for various other types of computer readable media. Electronic system 700 includes a bus 710, processing unit(s) 760, a system memory 730, a read-only memory (ROM) 750, a permanent storage device 730, an input device interface 770, an output device interface 740, and a network interface 780.

Bus 710 collectively represents all system, peripheral, and chipset buses that communicatively connect the numerous internal devices of electronic system 700. For instance, bus 710 communicatively connects processing unit(s) 760 with ROM 750, system memory 730, and permanent storage device 720.

From these various memory units, processing unit(s) 760 retrieves instructions to execute and data to process in order to execute the processes of the subject disclosure. The processing unit(s) can be a single processor or a multi-core processor in different implementations.

ROM 750 stores static data and instructions that are needed by processing unit(s) 760 and other modules of the electronic system. Permanent storage device 720, on the other hand, is a read-and-write memory device. This device is a non-volatile memory unit that stores instructions and data even when electronic system 700 is off. Some implementations of the subject disclosure use a mass-storage device (for example, a magnetic or optical disk and its corresponding disk drive) as permanent storage device 720.

Other implementations use a removable storage device (for example, a floppy disk, flash drive, and its corresponding disk drive) as permanent storage device 720. Like permanent storage device 720, system memory 730 is a read-and-write memory device. However, unlike storage device 720, system memory 730 is a volatile read-and-write memory, such as a random access memory. System memory 730 stores some of the instructions and data that the processor needs at runtime. In some implementations, the processes of the subject disclosure are stored in system memory 730, permanent storage device 720, or ROM 750. For example, the various memory units include instructions for scaling an application window. From these various memory units, processing unit(s) 760 retrieves instructions to execute and data to process in order to execute the processes of some implementations.

Bus 710 also connects to input and output device interfaces 770 and 740. Input device interface 770 enables the user to communicate information and select commands to the electronic system. Input devices used with input device interface 770 include, for example, alphanumeric keyboards and pointing devices (also called "cursor control devices"). Output device interfaces 740 enables, for example, the display of images generated by the electronic system 700. Output devices used with output device interface 740 include, for example, printers and display devices, for example, cathode ray tubes (CRT) or liquid crystal displays (LCD). Some implementations include devices, for example, a touchscreen that functions as both input and output devices.

Finally, as shown in FIG. 7, bus 710 also couples electronic system 700 to a network (not shown) through a network interface 780. In this manner, the computer can be a part of a network of computers (for example, a local area network (LAN), a wide area network (WAN), or an Intranet, or a network of networks, for example, the Internet. Any or all components of electronic system 700 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A method of displaying multiple applications comprising:
   determining a first window size for displaying a first application on a display;
   instructing, by an operating system (OS), the first application to render at the first window size;
   performing a first rendering of the first application at the first window size in response to the instructing;
   determining a second window size for displaying the first application on the display;
   determining, by the OS, a scale value for scaling the first rendering to the second window size;
   performing, by the OS, a second rendering of the first application at the second window size, based on scaling the first rendering to the second window size according to the determined scale value;
   displaying the second rendering on the display;

receiving a user input in association with the second rendering;
adjusting, by the OS, the user input based on the determined scale value to correspond to the first rendering; and
providing the adjusted user input to the first application.

2. The method of claim 1, wherein the first rendering is not displayed on the display.

3. The method of claim 1, wherein the first window size corresponds to a maximum window size for the display.

4. The method of claim 1, wherein the second rendering is displayed over at least a portion of a second application window.

5. The method of claim 4, wherein a second application window size of the second application window corresponds to a maximum window size for the display.

6. The method of claim 1, wherein the second window size rendering is displayed in a notification portion of the OS.

7. The method of claim 1, wherein the displaying the second window size rendering is in response to a status change in the first application.

8. The method of claim 1, further comprising displaying a notification near the second window size rendering on the display in response to a status change in the first application.

9. The method of claim 1, further comprising:
determining a third window size for displaying the first application on the display;
rendering the first application at the third window size based on scaling the first window size rendering to the third window size according to a second scale value; and
displaying the third window size rendering on the display.

10. The method of claim 9, wherein displaying the third window size rendering is in response to a status change in the first application.

11. The method of claim 1, wherein adjusting the user input further comprises scaling a location component of the user input based on the determined scale value.

12. A non-transitory machine-readable medium comprising instructions stored therein, which when executed by a machine, cause the machine to perform operations comprising:
determining a first window size for displaying a first application on a display;
instructing, by an operating system (OS), the first application to render at the first window size;
performing a first rendering of the first application at the first window size in response to the instructing;
determining a second window size for displaying the first application on the display;
determining, by the OS, a scale value for scaling the first rendering to the second window size;
performing, by the OS, a second rendering of the first application at the second window size, based on scaling the first rendering to the second window size according to the determined scale value;
displaying the second rendering on the display;
receiving a user input in association with the second rendering;
adjusting, by the OS, the user input based on the determined scale value to correspond to the first rendering; and
providing the adjusted user input to the first application.

13. The non-transitory machine-readable medium of claim 12, wherein adjusting the user input further comprises scaling a location component of the user input based on the determined scale value.

14. The non-transitory machine-readable medium of claim 12, wherein the second rendering is displayed with an icon corresponding to the first application.

15. The non-transitory machine-readable medium of claim 14, wherein the second rendering is displayed in response to activating the icon corresponding to the first application.

16. The non-transitory machine-readable medium of claim 12, wherein the second rendering includes user interface (UI) elements scaled by the determined scale value.

17. A system, comprising:
one or more processors; and
a non-transitory computer-readable medium comprising instructions stored therein, which, when executed by the one or more processors, cause the one or more processors to perform operations comprising:
determining a first window size for displaying a first application on a display;
instructing, by an operating system (OS), the first application to render at the first window size;
performing a first rendering of the first application at the first window size in response to the instructing;
determining a second window size for displaying the first application on the display;
determining, by the OS, a scale value for scaling the first rendering to the second window size;
performing, by the OS, a second rendering of the first application at the second window size, based on scaling the first rendering to the second window size according to the determined scale value;
displaying the second rendering on the display;
receiving a user input in association with the second rendering;
adjusting, by the OS, the user input based on the determined scale value to correspond to the first rendering; and
providing the adjusted user input to the first application.

18. The system of claim 17, wherein the operations further comprise:
determining a third window size for displaying a second application on the display;
performing a first rendering of the second application at the third window size;
determining a fourth window size for displaying the second application on the display;
determining a second scale value for scaling the first rendering of the second application to the fourth window size;
performing a second rendering of the second application at the fourth window size, based on scaling the first rendering of the second application to the fourth window size according to the determined second scale value; and
displaying the second rendering of the second application on the display.

19. The system of claim 18, wherein the operations further comprise:
receiving a second user input in association with the second rendering of the second application;
adjusting the second user input based on the determined scale value; and providing the adjusted second user input to the second application.

20. The system of claim 18, wherein the second rendering of the second application is displayed adjacent to the second rendering of the first application.

\* \* \* \* \*